United States Patent [19]

Jeurissen et al.

[11] 3,988,301

[45] Oct. 26, 1974

[54] PROCESS FOR THE PREPARATION OF HIGH-MOLECULAR WEIGHT

[75] Inventors: Lambert Gaston Jeurissen; Frans Antoon De Smedt, both of Edegem, Belgium

[73] Assignee: AGFA-GEVAERT N.V., Mortsel, Belgium

[22] Filed: Nov. 1, 1974

[21] Appl. No.: 520,221

[30] Foreign Application Priority Data

Nov. 6, 1973 United Kingdom............... 51381/73

[52] U.S. Cl. ........................... 260/75 M; 260/40 R; 260/860
[51] Int. Cl.$^2$......................................... C08G 63/22
[58] Field of Search ............... 260/75 M, 860, 40 R

[56] References Cited
UNITED STATES PATENTS 3,767,601  10/1973  Knox........................... 260/75 M X
3,849,379  11/1974  Jeurissen et al................. 260/75 M Primary Examiner—Lucille M. Phynes
Attorney, Agent, or Firm—A. W. Breiner

[57] ABSTRACT

A reaction mixture comprising terephthalic acid and bis(2-hydroxyethyl) terephthalate in a molar ratio of from 1:1 to 1.1:1, and ethylene glycol in a molar ratio of from 0.3:1 to 0.9:1 with respect to the terephthalic acid, is heated at a temperature between 240° and 310° C and in an inert atmosphere to produce a precondensate consisting of a low molecular weight esterification product. A first part of the precondensate thus formed is then polycondensed further at a temperature of from 260° to 300° C at subatmospheric pressure to form a high molecular weight linear polyethylene terephthalate, and a second part is preglycolised with ethylene glycol to bis(2-hydroxyethyl) terephthalate, which is processed in like manner to the first, and so on in a continuous or batch process.

According to the invention, there is added to the first, second and/or third reaction steps polyethylene terephthalate scrap together with fresh terephthalic acid and/or ethylene glycol in such quantity or quantities as to form a further amount of the reaction mixtures in the specified molar proportions.

6 Claims, No Drawings

PROCESS FOR THE PREPARATION OF HIGH-MOLECULAR WEIGHT

The invention relates to the production of high molecular weight polyethylene terephthalates.

High molecular weight linear polyesters with interesting properties for various uses, in particular the manufacture of film, can be produced starting from terephthalic acid and ethylene glycol. However the esterification rate of terephthalic acid with ethylene glycol is very low and this has militated against the use of this process. Attempts to increase the production rate by using very high temperatures is not attractive because it necessitates the use of special pressure vessels for the esterification reaction and the increased temperatures have an unfavourable effect on the mechanical properties of the polyester. Another disadvantage of direct esterification of terephthalic acid with ethylene glycol is the rather high consumption of ethylene glycol.

The present invention has as one object the provision of a relatively quick process whereby high molecular weight polyesters with valuable properties can be produced using terephthalic acid and a relatively small amount of ethylene glycol as starting materials.

Another object of the present invention is to provide such a process in which polyethylene terephthalate scrap can be used to provide a proportion of the reaction ingredients.

High molecular weight polyethylene terephthalate can be formed into shaped products such as films and fibers. A particularly important use of such polyesters is for making film supports for photographic materials. During the manufacture of such films and especially during the application of light-sensitive and non-light-sensitive layers thereto, a considerable amount of film is removed as scrap. Different processes have been proposed for the processing of such scrap into fresh polyester. In most of these processes, the scrap, after removal of the different coating layers thereon, is degraded into low molecular weight polyesters, or even into the monomeric components used in the manufacture of the high molecular weight polyester. By contrast, the present invention enables the polyethylene terephthalate scrap, whether it be scrap in film, fibre, granule or any other form, to be introduced as such directly into a process for the production of high molecular weight polyethylene terephthalate.

According to the present invention, there is provided a process for the production of high molecular weight polyethylene terephthalate, wherein a reaction mixture comprising terephthalic acid and bis(2-hydroxyethyl) terephthalate in a molar ratio of from 1:1 to 1.1:1, and ethylene glycol in a molar ratio of from 0.3:1 to 0.9:1 with respect to the terephthalic acid, is heated at a temperature between 240° and 310° C and in an inert atmosphere to produce a precondensate consisting of a low molecular weight esterification product; a first part of the precondensate thus formed is then polycondensed further at a temperature of from 250° to 300° C at subatmospheric pressure to form a high molecular weight linear polyethylene terephthalate, and a second part is mixed, as such or after pre-glycolisation with ethylene glycol to bis(2-hydroxyethyl) terephthalate, with polyethylene terephthalate scrap or with such scrap and with fresh terephthalic acid and/or ethylene glycol in such quantity or quantities as to form a further amount of a said reaction mixture comprising terephthalic acid, bis(2-hydroxyethyl) terephthalate and ethylene glycol in the specified molar proportions; which further amount of reaction mixture is processed in like manner to the first, and so on in a continuous or batch process.

The present invention also includes a process as thus defined but with the modification that polyethylene terephthalate scrap is added to said second part of the precondensate and such precondensate part and said scrap are simultaneously reacted with ethylene glycol to form bis(2-hydroxyethyl) terephthalate with simultaneous depolymerisation of said scrap, and the resulting mixture is mixed with fresh terephthalic acid and/or ethylene glycol and/or with further polyethylene terephthalate scrap to form said further amount of a said reaction mixture.

A process according to the invention can be performed continuously or discontinuously (batch-wise).

Although polyethylene terephthalate scrap of any physical form can be used, the scrap should be in the form of small pieces or particles. The primary interest herein lies in the use of film scrap and such scrap will therefore be referred to hereafter. The film scrap is preferably chopped into small particles having a mean dimension of about 10 mm. Thus the film scrap may be chopped in a knife-mill provided with a sieve having holes of 8 to 16 mm. When the film scrap is derived from a photographic material production plant and carries one or more layers, e.g., adhesive layers, subbing layers and light-sensitive silver halide emulsion layers, these layers are of course first eliminated from the scrap film so that the scrap introduced into the polyester production process is not contaminated. The removal of the coating layers on the polyester film may be achieved by known processes, e.g. as described in the specification of our co-pending U.S. Ser. No. 377,299 filed July 9, 1973.

A certain amount of bis(2-hydroxyethyl) terephthalate is needed at the start of the polyester production process.

This bis(2-hydroxyethyl) terephthalate can be obtained by known processes, e.g. by a transesterification reaction between dimethyl terephthalate and ethylene glycol. This reaction can be accelerated catalytically by the addition of known transesterification catalysts.

In practice when dimethyl terephthalate is reacted with ethylene glycol, the product is not an homogeneous product consisting solely of bis(2-hydroxyethyl) terephthalate. The product obtained is a mixture consisting mainly of bis(2-hydroxyethyl) terephthalate and of a minor amount of low molecular weight esterification products thereof together with some free ethylene glycol. Such a reaction product as a whole is regarded as bis(2-hydroxyethyl) terephthalate for the purposes of the present specification.

This bis(2-hydroxyethyl) terephthalate can be further polycondensed with itself to form high molecular weight linear polyesters. This is in fact a usual feature of known processes. However, in a process according to the present invention, in order to make possible the use of terephthalic acid instead of having to start again and again with dimethyl terephthalate needed in the production of bis(2-hydroxyethyl) terephthalate, there are added to the amount of bis(2-hydroxyethyl) terephthalate used initially at the start of the process, predetermined amounts of terephthalic acid and ethylene glycol in the free state or bound as polyethylene terephthalate scrap. This addition occurs with continuous stirring and atmospheric pressure in an inert atmosphere and with heating of the reaction mixture at a temperature between 240° and 300° C.

Although the terephthalic acid may be used in a molar proportion as high as 1.1:1 with respect to the bis(2-hydroxyethyl) terephthalate, these ingredients are preferably used in equimolar amounts.

In the case that the bis(2-hydroxyethyl) terephthalate used in the precondensation reaction in each batch or cycle of the process after the first is derived solely by glycolisation of the second part of the precondensate formed in the previous batch or cycle, the precondensate formed in each batch or cycle should be divided into first and second parts of equal volume in order that the amount of ethylene glycol in each of the successive batches or cycles shall be appropriate for the following batch or cycle, assuming that the reaction circumstances are maintained constant throughout the process, i.e. that the amounts of fresh terephthalic acid and ethylene glycol fed in, and the polyester production rate, remains constant from one batch or another.

Such a process according to the invention, i.e. a process involving a 50.50 division of the precondensate and glycolisation of one of the precondensate parts to bis(2-hydroxyethyl) terephthalate for use as part of the reaction mixture from which precondensate is formed in a following process stage or cycle, may be planned so that it is a modification of the process according to the invention which is described in our co-pending U.S. Ser. No. 251,167 filed May 8, 1972, now U.S. Pat. No. 3,849,379.

In the process of producing a high molecular weight polyester from terephthalic acid and ethylene glycol according to the said co-pending application, terephthalic acid and ethylene glycol are in a first step added to bis(hydroxyethyl) terephthalate. From 1.0 to 1.1 mole, preferably 1 mole, of terephthalic acid is added per mole of bis(2-hydroxyethyl) terephthalate, and 0.3 to 0.9 mole of ethylene glycol per mole of free terephthalic acid added. The mixture is heated at a temperature between 240° and 310° C in an inert atmosphere and at atmospheric pressure until a precondensate consisting of low molecular weight esterification product is obtained, the precondensate preferably having an average polycondensation degree comprised between 2 and 10, and most preferably between 4 and 8. In a second reaction step about half the amount of precondensate formed is separated out and polycondensed further at a temperature of 260° to 300° C and at a reduced pressure until a high molecular weight linear polyester is obtained. The other half of the precondensate is made to react with ethylene glycol in a third reaction step at a temperature above 200° C and at atmospheric pressure. The amount of ethylene glycol added in this step is equal to a value which is molecularly equivalent to the amount of free terephthalic acid added in the first reaction step minus half the amount of ethylene glycol that has already been added in the first reaction step. Since in the first reaction step between 0.3 and 0.9 mole of ethylene glycol is added per mole of free terephthalic acid, there can be added in the third reaction step between 0.85 and 0.55 mole of ethylene glycol per mole of terephthalic acid added in the first reaction step. In the third reaction step the precondensate is glycolysed to bis(2-hydroxyethyl) terephthalate that can be used as starting material in the first reaction step of a following polycondensation batch. A process according to the present invention may be a process as thus defined with however the modification that polyethylene terephthalate scrap is used in the process to provide the whole or part of the terephthalic acid and/or ethylene glycol, and/or is used in substitution for part of the amount of precondensate which would otherwise be required to be reacted with ethylene glycol to form the bis(2-hydroxyethyl) terephthalate required for use in the formation of precondensate in each process batch or cycle after the first.

Expressed in other terms, a process according to the present invention may be a process according to the invention defined as above referred to in U.S. Ser. No. 251,167 filed May 8, 1972, now U.S. Pat. No. 3,849,379, the terephthalic acid and/or the ethylene glycol being replaced partly or wholly by polyethylene terephthalate scrap, with the proviso, however, that the amounts of free terephthalic acid and of free ethylene glycol, added to the amounts of bound terephthalic acid and bound ethylene glycol respectively, comprised in the polyethylene terephthalate scrap, satisfy the ratios given above.

It was also found that some catalysts, which are known to accelerate the polycondensation step in known processes, can be added advantageously during the first reaction step of a process according to the present invention.

In this first reaction step a precondensate is formed consisting of a low molecular weight esterification product, preferably having an average polycondensation degree comprised between 2 and 10, more especially between 4 and 8.

In the process according to U.S. Ser. No. 251,167 filed May 8, 1972, now U.S. Pat. No. 3,849,379 aforesaid the process is continued in a second reaction step by separating out about half the amount of precondensate formed in the first reaction step and further polycondensing that half at a temperature above 200° C at a reduced pressure, preferably below 1 mm of mercury, until a high molecular weight linear polyester is formed. When carrying out the present invention it is not always necessary to separate out only about half the amount of precondensate for further polycondensation. This amount may be much larger and be up to, say, three fourths of the amount of precondensate. Indeed, in the third reaction step of the process according to U.S. Ser. No. 251,167 filed May 8, 1972, now U.S. Pat. No. 3,849,379, half the amount of precondensate was glycolised to reform bis(2-hydroxyethyl) terephthalate needed in a following polycondensation batch. In carrying out, the present invention, part of the precondensate which in that other process is subjected to glycolisation in the third reaction step may be replaced by polyethylene terephthalate scrap, the amount of bound terephthalic acid thereby introduced being compensated by the addition of corresponding amounts of ethylene glycol. In that case it is not necessary to glycolise half the amount of the precondensate and in consequence a substantially higher proportion of the precondensate produced in the first step can be polycondensed directly to high molecular weight polyethylene terephthalate. This further polycondensation can be carried out, e.g., as a solid phase-polycondensation, wherein granulated precondensate is heated in fluidized form in an inert gas atmosphere at a temperature above 200° C and at a reduced pressure. This can be executed very conveniently in a vacuum tumbling drier, i.e. an apparatus that is normally used for the drying of polyester granulate before its extrusion. For this purpose the precondensate granulate while being agitated in the tumbling drier is heated at 200°–240° C under a pressure of 0.1 to 5 mm of mercury.

The polycondensation reaction can also be carried out in the melt, the precondensate being stirred at a temperature of 270°–290° C and at a much reduced pressure, preferably comprised between 0.1 and 3 mm of mercury.

The polycondensation reaction can be promoted by means of known polycondensation catalysts. A germanium or titanium compound can be added as catalyst during the first reaction step, in which case no further addition of catalyst is required in the second reaction step because the germanium or titanium compound already present catalyzes the polycondensation reaction.

It might be advisable for the polycondensation reaction to be performed in the presence of a stabilizing agent such as phosphoric acid, phosphorous acid and derivatives thereof such as triphenyl phosphate, triphenyl phosphite, tricresyl phosphite and also aliphatic phosphoric acid esters such as trimethyl phosphate; further also phosphonic acid esters. A said stabilizing agent may already be present during the esterification reaction in the first reaction step, thus contributing to a less pronounced colouration of the reaction mixture.

In the case that the retained part of the precondensate is pre-glycolised to bis(2-hydroxyethyl) terephthalate which is then mixed with terephthalic acid and ethylene glycol for forming a further quantity of precondensation reaction mixture, it is suitable to stir the glycolisation mixture at a temperature above 200° C for up to 30 minutes. As an alternative to such pre-glycolisation the glycolisation of the retained part of the precondensation may be the formation of a further amount of precondensate. In other words the glycolisation of the retained part of the precondensate from one process batch or cycle is carried out in the presence of terephthalic acid and film scrap and the glycolisation occurs simultaneously with the esterification of terephthalic acid to a precondensate.

The following examples illustrate the invention without limiting it thereto. In these examples the crystalline melting point of the polyester is determined by heating a crystallised sample of polyester on the heating stage of a polarising microscope. The temperature of the heating stage is raised at a rate of 0.8° C/min. The crystalline melting point is the temperature, at which between crossed nicols the last trace of birefringence disappears.

Differences in the melting point of consecutively prepared polyesters are mainly due to fluctuations in their diethylene glycol content. The higher this diethylene glycol content, the lower the melting point of the polyester in consequence of the internal plasticisation of the polyester by the diethylene glycol present. Accordingly, when a particular polyester has a high melting point, its diethylene glycol content is certainly very low.

At the end of the polycondensation step the colour of the molten polyester is compared visually with artbitrary colour standards consisting of aqueous solutions of du Pont Pontamine Catechu 3G dye (colour index 36,300), according to the following system of colour ratings:

0 = pure water
1 = 0.00025 gram of the above dye dissolved in 100 ml of water
2 = twice as much dye as in 1
3 = three times as much dye as in 1
4 = four times as much dye as in 1
5 = etc.

The polycondensation degree of the polyester is given in the Examples by its inherent viscosity, which is determined for 0.5 % solutions of the polyester in 60:40 by volume mixtures of phenol and o-dichlorobenzene.

Unless indicated otherwise all parts given in the following examples are parts by weight and all percentages are percentages by weight.

For easiness' sake the name bis(2-hydroxyethyl)-terephthalate will be abbreviated in the following examples to BHET, terephthalic acid to TA, ethylene glycol to EG and polyethylene terephthalate film scrap to film scrap respectively.

In the first part of Example 1 a method is described for the manufacture of the starting amount of BHET needed in the process of the invention. This starting amount of BHET is then esterified with TA and film scrap to a precondensate. The film scrap supplies all the EG in this first reaction step. The full amount of precondensate is further polycondensed to a high molecular weight linear polyester.

In the other Examples polyethylene terephthalate film scrap is used to supply according to a part of the terephthalic acid in the first reaction step. Part of the precondensate formed is then further polycondensed as indicated in Example 1. In some Examples film scrap is also added in the third reaction step, a corresponding amount of ethylene glycol being added also, so that in fact glycolisation to BHET and esterification to a precondensate occurs at the same time.

EXAMPLE 1

19.4 g of dimethyl terephthalate (0.1 mole) and 13.64 g of EG (0.22 mole) ware replaced in a glass polymerisation tube and 6.5 mg of manganese (II) phenyl acetate ($2.10^{-4}$ mole/mole of dimethyl terephthalate) were added. The reactants were heated for 3 hours at 197° C at atmospheric pressure. A continuous stream of dry nitrogen was introduced through a capillary tube reaching to the bottom of the reaction tube. As soon as the ester interchange reaction was finished, the temperature was raised gradually over 30 min to 250° C and the excess of EG was distilled off. The BHET obtained was then used as the starting material in the first reaction step.

In a glass polymerisation tube equipped with a stirrer, an inlet for dry nitrogen, and a distillation column, a mixture was introduced of 25.4 g of the above prepared BHET (0.1 mole), 8.3 g of TA (0.05 mole), 9.6 g of film scrap (0.05 mole), 4.2 mg of germanium dioxide ($4 \times 10^{-4}$ mole/mole of BHET) and 13 mg of triphenyl phosphate ($4 \times 10^{-4}$ mole/mole of BHET).

The reactants were heated and stirred at atmospheric pressure under a continuous stream of dry nitrogen and water was distilled off. As heating medium, vapour bath of methyl-$\beta$-naphthyl ether, was used giving a temperature of 270° C. After 20 minutes a clear reaction mass of precondensate consisting of low molecular weight polyester was obtained having an average polycondensation degree of 4.

The esterification reaction being finished, i.e. when water was not distilled over anymore, the temperature was raised over 30 minutes to 282° C and the pressure was reduced to 0.1–0.3 mm of mercury. After 3 hours of stirring at 282° C, vacuum was released and a polyethylene terephthalate polyester was obtained having an inherent viscosity of 0.65. The polyester was clear, had a standard colour of 2 and melted at 267° C indicating a low diethylene glycol content.

EXAMPLE 2

In a glass polymerisation tube equipped with a stirrer, an inlet for dry nitrogen, and a distillation column, a mixture was introduced of 25.4 g of the BHET (0.1 mole) prepared as described in the first part of Example 1. Subsequently, 12.45 g of TA (0.075 mole), 0.31 g of EG (0.005 mole), 4.8 g of film scrap (0.025 mole), 4.2 mg of germanium dioxide ($4.10^{-4}$ mole/mole of BHET) and 13 mg of triphenyl phosphate ($4.10^{-4}$ mole/mole of BHET) were introduced also.

The reactants were heated and stirred at atmospheric pressure under a continuous stream of dry nitrogen and water was distilled off. As heating medium, a vapour bath of methyl-$\beta$-naphthyl ether was used giving a temperature of 270° C. After 35 minutes a clear reaction mass of precondensate consisting of low molecular weight polyester was obtained having an average polycondensation degree of 6. Half the amount of precondensate formed was polycondensed as indicated in Example 1 and yielded a polyester with similar properties. The other half was transported to another reaction zone where it was glycolised with 5.27 parts of EG (0.085 mole) by heating the reactants for 30 minutes under a reflux condenser at atmospheric pressure in an atmosphere of nitrogen on a vapour bath of 255° C. The BHET formed could be used again as described in the first reaction step.

EXAMPLE 3

The process of Example 2 was repeated with the difference, however, that to BHET 4.15 g of terephthalic acid (0.025 mole) and 14.4 g of film scrap (0.075 mole) were added. The esterification ended after 10 min when a clear melt of low molecular weight precondensate was formed. Just as in Example 2, half the amount of precondensate formed was polycondensed to high molecular weight polyester, and the other half was glycolised with 3.875 parts of EG (0.0625 mole) to reform BHET for a following reaction batch.

EXAMPLE 4

The process of Example 2 was repeated with the difference, however, that the amount of film scrap was increased to 17.28 g (0.09 mole) and that the amount of TA was increased to 14.11 g (0.085 mole). Once the esterification finished a clear melt of low molecular weight precondensate was formed. Just as in Example 2, half the amount of precondensate was polycondensed to high molecular weight polyester, and the other half was glycolised with 7.595 parts of EG (0.1225 mole) to reform BHET.

EXAMPLE 5

In a glass polymerisation tube equipped with a stirrer, an inlet for dry nitrogen, and a distillation column, a mixture of 25.4 g of BHET (0.1 mole) prepared as described in the first part of Example 1, 8.3 g of TA (0.05 mole), 9.6 g of film scrap (0.05 mole), 4.2 mg of germanium dioxide ($4.10^{-4}$ mole/mole BHET), and 13 mg of triphenyl phosphate ($4.10^{-4}$ mole/mole BHET) was introduced. The reactants were heated and stirred at atmospheric pressure under a continuous stream of dry nitrogen. As heating medium a vapour bath of methyl-$\beta$-naphthyl ether was used giving a temperature of 270° C. Water was distilled off. After 20 minutes a clear mass of pre-condensate was obtained.

Half the amount of the thus prepared precondensate was polycondensed as indicated in Example 1. A clear polyester was formed having a standard colour of 2, an intrinsic viscosity of 0.65 and a crystalline melting point of 267° C.

To the other half amount of precondensate 8.3 g of TA (0.05 mole), 9.6 g of film scrap (0.05 mole), 4.65 g of EG (0.075 mole), 2.1 mg of germanium dioxide ($2.10^{-4}$ mole/mole of TA) and 6.5 mg of triphenylphosphate ($2.10^{-4}$ mole/mole of TA) were added.

The reaction mixture was treated as in the first reaction step of this Example and the same precondensate was obtained, that can be used in a polycondensation reaction as described in Example 1 to give a high molecular weight polyethylene terephthalate.

EXAMPLE 6

In a glass polymerisation tube equipped with a stirrer, an inlet for nitrogen gas and a distillation column a mixture of 12.7 g of BHET (0.05 mole), 9.6 g of film scrap (0.05 mole), 4.96 g of EG (0.08 mole), 16.6 g of TA (0.1 mole), 4.2 mg of germanium dioxide ($4.10^{-4}$ mole/mole of TA), and 13 mg of triphenyl phosphate ($4.10^{-4}$ mole/mole of TA) was introduced.

The reactants were heated at atmospheric pressure under a continuous stream of dry nitrogen. As heating means vapours of methyl-$\beta$-naphthyl ether at 270° C were used. After 70 min a clear precondensate was formed.

Three fourths of this precondensate were further polycondensed as described in Example 1. A polyethylene terephthalate was obtained having a standard colour of 1.5, an intrinsic viscosity of 0.68 dl/g and a crystalline melting point of 267° C.

To the other fourth of precondensate 9.6 g of film scrap (0.05 mole), 7.595 g of EG (0.1225 mole), 16.6 g of TA (0.1 mole), 3.15 mg of germanium dioxide, and 9.75 mg of triphenyl phosphate were added.

This reaction mixture was treated as in the first reaction step of this Example and the same precondensate was obtained. This precondensate can be further polycondensed to high molecular weight polyethylene terephthalate.

We claim:

1. A process for the production of high molecular weight polyethylene terephthalate wherein a reaction mixture comprising terephthalic acid and bis(2-hydroxyethyl) terephthalate in a molar ratio of from 1:1 to 1.1:1, and ethylene glycol in a molar ratio of from 0.3:1 to 0.9:1 with respect to the terephthalic acid, is heated at a temperature between 240° and 310° C and in an inert atmosphere to produce a precondensate consisting of a low molecular weight esterification product, a first part of the precondensate thus formed is then polycondensed further at a temperature of from 260° to 300° C at subatmospheric pressure to form a high molecular weight linear polyethylene terephthalate, and a second part is mixed, as such or after pre-glycolisation with ethylene glycol to bis(2-hydroxyethyl) terephthalate, with polyethylene terephthalate scrap or with such scrap and with fresh terephthalic acid and/or ethylene glycol in such quantity or quantities as to form a further amount of a said reaction mixture comprising terephthalic acid, bis(2-hydroxyethyl) terephthalate and ethylene glycol in the specified molar proportions; which further amount of reaction mixture is processed in like manner to the first, and so on in a continuous or batch process.

2. A process according to claim 1, but with the modification that polyethylene terephthalate scrap is added to said second part of the precondensate and such precondensate part and said scrap are simultaneously reacted with ethylene glycol to form bis(2-hydroxyethyl) terephthalate with simultaneous depolymerisation of said scrap, and the resulting mixture is mixed with fresh terephthalic acid and/or ethylene glycol and/or with further polyethylene terephthalate scrap to form said further amount of a said reaction mixture.

3. A process according to claim 2, wherein the production of the precondensate is promoted by means of germanium dioxide as catalyst.

4. A process according to claim 1, wherein the polycondensation of the first part of the precondensate is stabilised by means of triphenyl phosphate.

5. A process according to claim 4, wherein the triphenyl phosphate is introduced into the process so as to be present in the reaction mixture from which the precondensate is formed.

6. A process according to claim 1, wherein the polyethylene terephthalate scrap which is used is polyethylene terephthalate film scrap in the form of particles having a mean dimension of about 10 mm.

* * * * *

UNITED STATES PATENT AND TRADEMARK OFFICE
CERTIFICATE OF CORRECTION

PATENT NO. : 3,988,301
DATED : October 26, 1976
INVENTOR(S) : Lambert Gaston JEURISSEN ET AL It is certified that error appears in the above-identified patent and that said Letters Patent are hereby corrected as shown below:

Title page, the title at [54] should read -- PROCESS FOR THE PREPARATION OF HIGH-MOLECULAR WEIGHT POLYESTERS --;

Title page, the issue date at [45] should read -- Oct. 26, 1976 --;

Column 1, the title should read -- PROCESS FOR THE PREPARATION OF HIGH-MOLECULAR WEIGHT POLYESTERS --.

Signed and Sealed this

Fifteenth Day of November 1977

[SEAL]

Attest:

RUTH C. MASON
Attesting Officer

LUTRELLE F. PARKER
Acting Commissioner of Patents and Trademarks

Disclaimer 3,988,301.—*Lambert Gaston Jeurissen* and *Frans Antoon De Smedt*, Edegem, Belgium. PROCESS FOR THE PREPARATION OF HIGH-MOLECULAR WEIGHT POLYESTERS. Patent dated Oct. 26, 1976. Disclaimer filed Sept. 29, 1982, by the assignee, *AGFA-Gevaert N. V.*

Hereby enters this disclaimer to all claims of said patent.
[*Official Gazette December 28, 1982.*]